GOODWIN & WEST.
Ore Concentrator.
No. 68,978.
Patented Sept. 17, 1867.
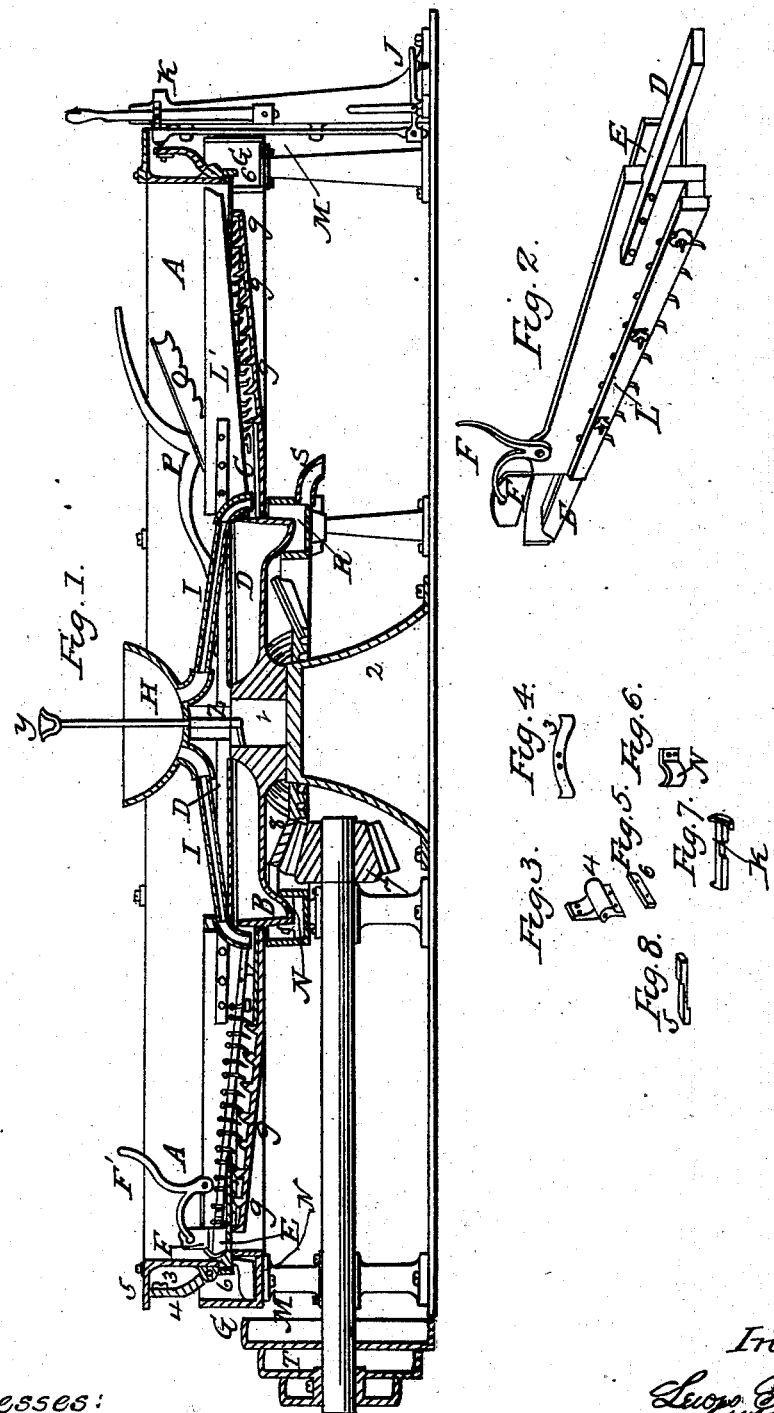

United States Patent Office.

LEWIS GOODWIN AND SAMUEL A. WEST, OF SAN FRANCISCO, CALIFORNIA.

Letters Patent No. 68,978, dated September 17, 1867.

---

IMPROVED ORE-CONCENTRATOR.

---

The Schedule referred to in these Letters Patent and making part of the same.

---

TO ALL WHOM IT MAY CONCERN:

Be it known that we, LEWIS GOODWIN and SAMUEL A. WEST, of San Francisco, county of San Francisco, and State of California, have invented certain new and useful improvements in "Concentrators;" and we do hereby declare the following description and accompanying drawings are sufficient to enable any person skilled in the art or science to which it most nearly appertains to make and use our said invention or improvements without further invention or experiment.

The nature of our invention is to provide an improved concentrator for concentrating sulphurets contained in ores, and consists in a circular concave disk, with riffles or grooves, the machine having a continuous rotary motion. The ore or pulp with water being received at the centre is carried by bent tubes to near the centre, and from thence by centrifugal force to the periphery of the disk, the heavier particles settling in the riffles in its passage, and the sand and debris, being separated by the current and constant agitation, are carried out by means of a trough or sluice placed transversely across the disk to the centre, and are discharged through openings into a stationary circular sluice or box below, and the sulphurets are discharged at the periphery of the disk by means of a plough into another stationary circular sluice below.

Other devices have been employed, circular in form, with a groove for retaining the sulphurets or other heavy matter until the sand has become separated from them, and then discharged at the periphery; but those machines depended upon a cam or eccentric motion for separating the sand and debris from the valuable portions, and oftentimes the machines must be stopped and assistance rendered in order to carry forward or proceed with the work.

It is proposed by the use of our machine that a constant rotary motion shall be kept up, and a constant charging and discharging shall be had, while the machine is in motion, by means of scrapers, ploughs, and agitators, and discharge valves, the whole arranged with a view of keeping the lighter particles, such as sand and debris, suspended in the water, so that they may be carried out with it, and the sulphurets be impacted or settled in the riffles.

In order to more fully illustrate and describe our invention, reference is had to the accompanying drawings and letters marked thereon, of which—

Figure 1 is a sectional elevation.

Figure 2 is a perspective view of the discharge trough and adjustable bar.

Figures 3, 4, 5, 6, 7, and 8 represent details of the machine.

A A represents a pan or disk, slightly concave to near the centre, which is elevated, forming a convex centre, B, which is surrounded by a deep groove perforated by holes. The centre of the pan is surrounded by a rim, and around the outer circumference is an inclined plane, C, which may be covered with an amalgamated copper plate. From this point to near the periphery of the pan are made circular riffles $g\ g\ g\ g'$, the outer one, or $g'$, being an inclined plane, the whole being surrounded by a rim. The pan rotates above a circular stationary trough, G, by means of a vertical shaft, 2, actuated by bevelled gearing 7 and 8. Beneath the centre of the pan is placed a circular trough, R, which surrounds the bevelled wheel 8, and has discharge openings, S, for discharging the sand or debris and water, which prevents it from falling upon the machinery. The centre of the pan B is slightly elevated, on the top of which is placed a stationary cross-bar, D, supporting trough E, box L, and plough O, the opposite end being a plain bar, L'. Underneath both box and bar are secured agitators for agitating the sulphurets lodged in the riffles of the pan. To one end of the bar D a trough or sluice, E, is attached, which extends from the central groove to the periphery of the pan, having a curved end or scraper, E', which reaches to near the surface of the plane. The mouth of this trough is closed by a gate, F, jointed and pivoted to an arm, F'. The trough or sluice is for the purpose of conveying the sand and debris to the central discharge. A bar, L, is attached to the trough E, to be raised and lowered by set-screws, so as to admit more or less of the current beneath it, or create eddies in front of it in passing around. In front of the sluice or trough is a plough, O, having curved teeth or scrapers, which operate in the riffles $g\ g$. This plough is attached to the bar D by an arm, P, and when not in use is raised up so as to be out of the pulp. By this means the sulphurets are carried to the periphery of the pan, and from thence through openings in it to the lower ledge or rim. The sulphurets and sand are received with water into the cup H, and pass through the curved tubes I I on to the copper plate C, and by centrifugal force the sand and debris and lighter particles are carried to the periphery of the pan, while the heavier particles will fall into the circular riffles, and in rotating, the agitators, under the arm D and sluice E, will stir up the lighter particles in the riffles, should any remain, which will be carried off by the current through the sluice, and be discharged through the centre of the pan. For discharging the sulphurets one or more openings is made in the outer rim of the pan, provided with a valve, 4, and spring, 5, which is opened and closed by cams K and J attached to an upright post at the side of the pan, and when it is desirable to keep the valve closed entirely, the cam K is moved back by an upright bar and does not actuate the spring 5.

In its operations, and in order to clean up the sulphurets, the flow of ore is stopped, the gate F closed, and a stream of clean water admitted through the cup H, and the bar L will create a circular current in front of it, by means of which, and the agitators under the bar D, they will have a tendency to stir up any remaining sand, which will be carried out with the water through the sluice E, after which the plough O may be lowered and the valve set in operation, which will carry the sulphurets to the periphery of the pan to be discharged into the lower ledge or circular trough G, and through openings M, by means of scrapers N, into a receptacle beneath.

Having thus described our invention, what we claim, and desire to secure by Letters Patent, is—

1. The concave rotary pan A A, with circular riffles $g\ g\ g\ g\ g\ g$, having an elevation toward the periphery of the pan, substantially as and for the purposes described.

2. The discharge-box E, receiving the discharge at the periphery, and discharging toward the centre, having teeth or agitators attached to it for operating in the riffles, and movable bar L to act on the pulp and water, and the gate F for cutting off the discharge, substantially as described.

3. The plough O, valve 4, spring 5, cams K and J, or their equivalents, substantially as described for the purpose set forth.

4. The stationary circular troughs R, for receiving the sand and debris, and G for receiving the sulphurets, and the scrapers N, attached to the rotary pan and working within the troughs R and G, substantially as described.

5. We claim the above-described parts when employed separately or in combination, for the purposes specified.

In witness whereof we have hereunto set our hands and seals.

L. GOODWIN, [L. S.]
S. A. WEST. [L. S.]

Witnesses:
C. W. M. SMITH,
GUS. A. MANTZ.